Sept. 14, 1965 H. F. LYMAN 3,206,004

CONVEYOR WITH SNAP-ON LINKS FOR DISHWASHING MACHINES

Filed Aug. 23, 1962 2 Sheets-Sheet 1

INVENTOR.
HOMER F. LYMAN

BY
ATTORNEY

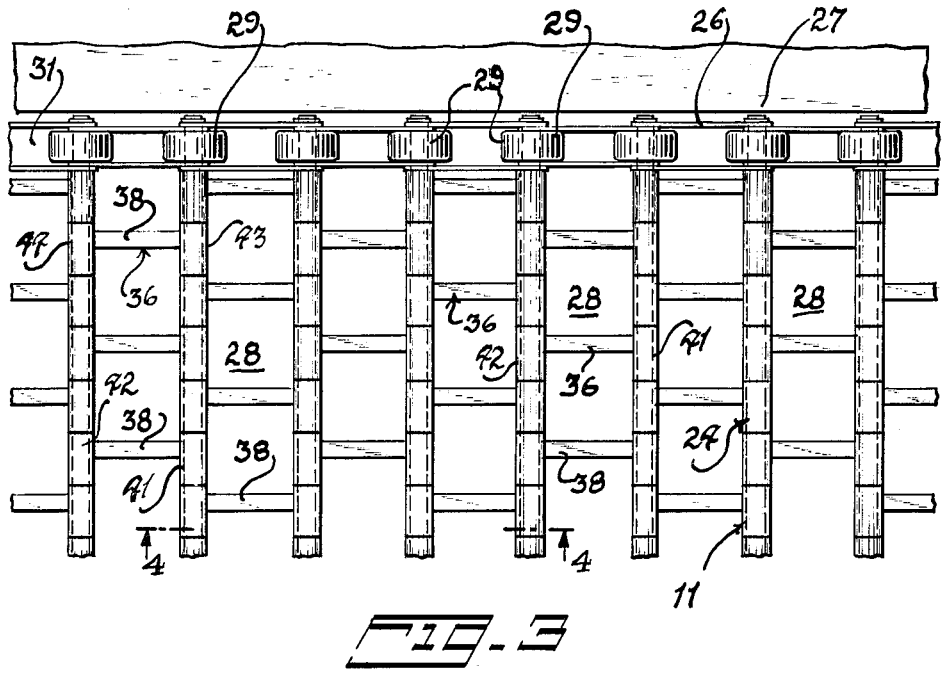
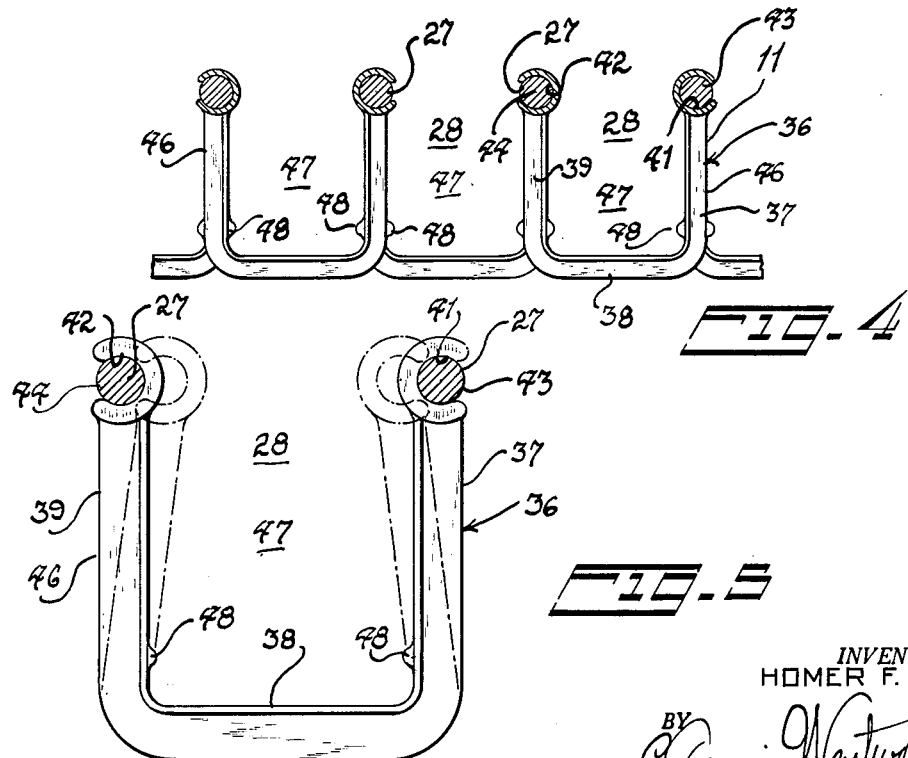

United States Patent Office 3,206,004
Patented Sept. 14, 1965

---

3,206,004
CONVEYOR WITH SNAP-ON LINKS FOR
DISHWASHING MACHINES
Homer F. Lyman, Nutley, N.J., assignor to Universal
Dishwashing Machinery Company, Nutley, N.J.
Filed Aug. 23, 1962, Ser. No. 218,919
3 Claims. (Cl. 198—131)

This invention resides in an endless conveyor having snap-on links especially suitable for a dishwashing machine.

It is known to employ an endless conveyor in dishwashing machines. But such assemblies are complex. This invention offers an endless conveyor which is simple to fabricate. As usual, rods are disposed transversely relative the course of the conveyor and links are pivotally connected at both ends to successive rods. It is here contemplated to employ links which are elastically deformable between a normal condition and an insert condition. In their normal condition the links are pivotally engageable with successive rods so that they span therebetween. In their insert condition the links are capable of passing between adjacent rods. Accordingly, the links are elastically deformed, inserted in position and then released to snap onto adjacent rods. Removal of links is accomplished by the converse of this operation.

Basically snap-on links contribute fabrication ease and economy.

Socket-on-rod joints provide a rotatable connection between links and rods. This joint has proven to be highly satisfactory.

Snap-on links are especially suitable for conveyors with pockets. Endless conveyors are often provided with links which define upwardly opening pockets to receive flatware endwise therein. Pocket links generally have two arms as well as a bottom portion with a pocket formed therebetween. Movement associated with positioning two sockets about their respective rods is substantial in this geometric context. When pocket links are employed, the arms (which can flex as cantilevers) offer easy elastic deformation of the links thereby facilitating engagement. When in place the links behave structurally as rigid frames with characteristic integrity of shape. Soft materials, such as plastics, are well adapted to service as pocket links so a cushioning opportunity is presented. Of course the snap-on feature is even more important in link replacement.

These and other features will appear more fully from the accompanying drawings wherein:

FIGURE 3 is a broken top view of a portion of the conveyor.

FIGURE 4 is a simplified broken side view of the conveyor taken along line 4—4 of FIGURE 3.

FIGURE 5 is an enlarged side view of a snap-on pocket link with associated rods showing the insert condition of the link in phantom lines and the normal condition in full lines.

Figure 1:
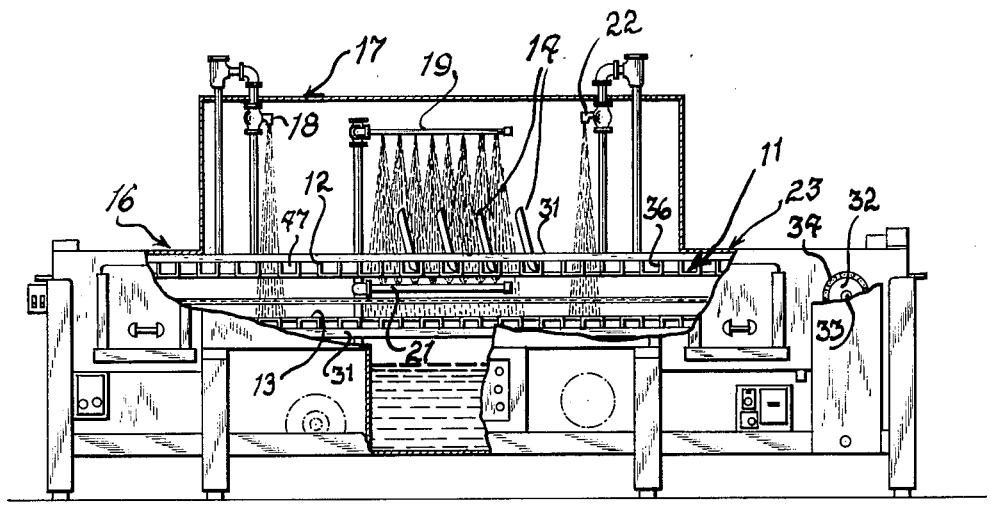
FIGURE 1 is a broken side view of a dishwashing machine having an endless conveyor embodying the present invention.

In its broad aspects the shown dishwasher is familiar to industry. Conveyor 11 describes an endless course having upper run 12 and lower run 13. Washing is accomplished along upper run 12. Dishes 14 are fed onto conveyor 11 in feed zone 16. Conveyor 11 carries the dishes through housing 17 where they are sprayed from nozzles 18, 19, 21 and 22 in a well known manner. Con- An automatic safety switch is generally provided to stop the conveyor in the event there is a failure to remove dishes from the conveyor. Conveyor 11 is recycled to feed zone 16 via lower run 13.

Figure 2:
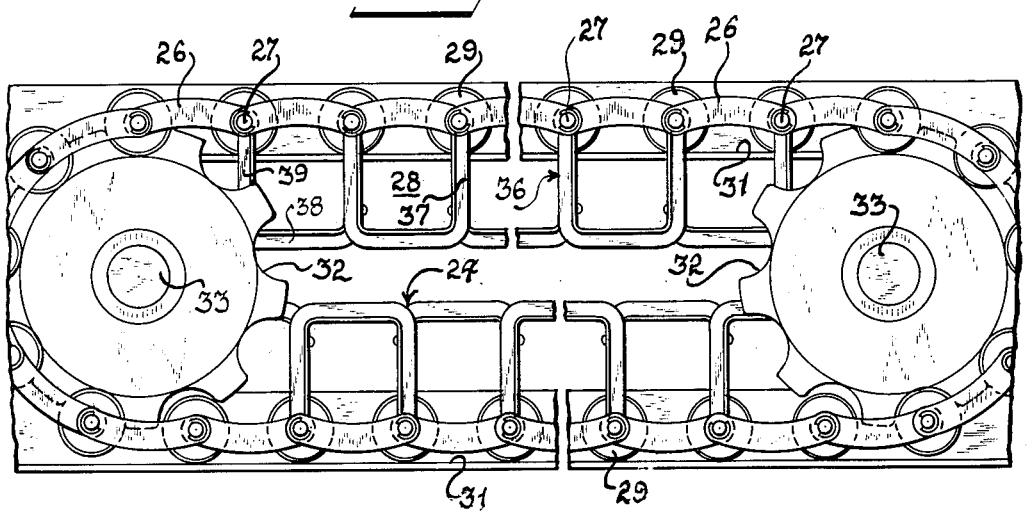
FIGURE 2 is a broken side view of this endless conveyor with associated side chains, rollers and sprocket wheels.

As shown in FIGURES 2 and 3, the conveyor includes inner portion 24 disposed between side drive chains 26. Rods 27 are generally made of stainless steel and are mounted transversely of the endless course followed by conveyor 11. Rods 27 are separated from each other by uniform spaces 28. The rods are connected to side drive chains 26 and are supported by rollers 29 which ride on tracks 31. Conveyor 11 passes about sprocket wheels 32 which are mounted on shafts 33. As shown in FIGURE 1, drive means are operatively associated with one of the sprocket wheels 32 by means of chain transmission 34.

Links 36 are mounted between rods 27 for supporting dishes and similar articles in position for washing. Links 36 are generally formed of non-corrosive material. Either metal or plastic is employed. These links move clockwise in the shown embodiment and are generally U-shaped with leading arm 37 bottom portion 38 and trailing arm 39.

As seen in FIGURES 4 and 5, leading arm 37 defines leading socket 41 and trailing arm 39 defines trailing socket 42 which snugly embrace leading rod 43 and trailing rod 44 respectively to support link 36 and accommodate rotation of rods 43 and 44 relative the link.

As best seen in FIGURE 5, links 36 are movable by elastic deformation between an insert condition shown in phantom lines and a normal condition shown in full lines. In the normal condition arms 37 and 39 are spaced apart to engage rods 43 and 44 so that link 36 spans therebetween. In the insert condition arms 37 and 39 are pinched close enough together so that link 36 can be passed through space 28 between rods 43 and 44.

Plastic links are conveniently formed by pressure moulding. A T-shaped cross-sectional area is preferred with stem 46 disposed outward relative pocket 47. Ridges 48 help position dishes 14 in pockets 47.

It will be apparent that wide changes may be made in the shown embodiment without departing from the spirit of invention defined by the claims.

What is claimed is:

1. A conveyor for a dishwashing machine comprising means describing an endless course having an upper run and a lower run, a plurality of rods operatively associated with said means disposed transversely relative the course and spaced from each other, a plurality of U-shaped links each having a leading arm and a trailing arm as well as a bottom portion defining a pocket, the leading and trailing arms extending approximately at right angles to the bottom portion, at least one of the arms elastically deformable relative the other arm between a normal extended condition and an insert contracted condition, in the insert contracted condition the links being capable of being passed between the rods for mounting or removal, in the normal condition the links being extended from the insert condition, the links having C-shaped sockets at the terminal ends of the leading and trailing arms facing outwardly from said pocket releasably and pivotally engaging a major portion of the circumference of the rods so that the links span the space between the rods, said sockets being arranged for snap-on engagement with the rods when the links are extended from their insert condition to their normal condition.

2. The conveyor of claim 1 with the cross-sectional area of the link substantially T-shaped and the stem outward relative the pocket.

3. The conveyor of claim 2 with the link defining at least one ridge projecting into the pocket.

(References on following page)

References Cited by the Examiner

UNITED STATES PATENTS

| 2,417,623 | 3/47 | Yellin | 16—87.2 |
| 2,621,779 | 12/52 | Harter | 198—195 |
| 3,017,014 | 1/62 | Cummings | 198—131 |

FOREIGN PATENTS 911,776  5/54  Germany.

SAMUEL F. COLEMAN, *Primary Examiner.*

ABRAHAM BERLIN, ERNEST A. FALLER,
*Examiners.*

UNITED STATES PATENT OFFICE
CERTIFICATE OF CORRECTION

Patent No. 3,206,004　　　　　　　　　　　　　September 14, 1965

Homer F. Lyman

It is hereby certified that error appears in the above numbered patent requiring correction and that the said Letters Patent should read as corrected below.

Column 1, line 71, for "Con-" read -- Conveyor 11 then moves the dishes to unloading zone 23. --.

Signed and sealed this 21st day of June 1966.

(SEAL)
Attest:

ERNEST W. SWIDER
Attesting Officer

EDWARD J. BRENNER
Commissioner of Patents